United States Patent
Del Rosario (10) Patent No.: US 12,032,703 B2
(45) Date of Patent: Jul. 9, 2024

(54) AUTOMATICALLY RATING THE PRODUCT'S SECURITY DURING SOFTWARE DEVELOPMENT

(71) Applicant: SAP SE, Walldorf (DE)

(72) Inventor: Ronald Del Rosario, Mountain House, CA (US)

(73) Assignee: SAP SE, Walldorf (DE)

( * ) Notice: Subject to any disclaimer, the term of this patent is extended or adjusted under 35 U.S.C. 154(b) by 429 days.

(21) Appl. No.: 17/368,082

(22) Filed: Jul. 6, 2021

(65) Prior Publication Data
US 2023/0012722 A1    Jan. 19, 2023

(51) Int. Cl.
G06F 21/57    (2013.01)
G06N 3/02    (2006.01)
G06N 20/00    (2019.01)

(52) U.S. Cl.
CPC ............ *G06F 21/577* (2013.01); *G06N 3/02* (2013.01); *G06N 20/00* (2019.01); *G06F 2221/033* (2013.01)

(58) Field of Classification Search
CPC ... G06F 21/577; G06F 2221/033; G06N 3/02; G06N 20/00
See application file for complete search history.

(56) References Cited

U.S. PATENT DOCUMENTS

| | | | | |
|---|---|---|---|---|
| 10,158,660 | B1* | 12/2018 | Reguly | H04L 63/20 |
| 10,691,810 | B1* | 6/2020 | Freitag | G06F 8/71 |
| 2013/0239167 | A1* | 9/2013 | Sreenivas | G06F 21/577 |
| | | | | 726/1 |
| 2019/0370476 | A1* | 12/2019 | Zhong | G06F 16/00 |
| 2020/0057850 | A1* | 2/2020 | Kraus | G06F 21/552 |
| 2021/0367961 | A1* | 11/2021 | Kuppa | G06F 40/205 |
| 2022/0100868 | A1* | 3/2022 | Tarrant | G06F 21/577 |
| 2022/0201011 | A1* | 6/2022 | Lee | H04L 63/1433 |

OTHER PUBLICATIONS

Catal, C. et al., "Development of a Software Vulnerability Prediction Web Service Based on Artificial Neural Networks," PAKDD 2017 Workshops, LNAI 10526, 59-67, (2017).

(Continued)

*Primary Examiner* — Thaddeus J Plecha
(74) *Attorney, Agent, or Firm* — Mintz Levin Cohn Ferris Glovsky and Popeo, P.C.

(57) ABSTRACT

According to an aspect, a method is provided that includes: receiving a first report from at least a first vulnerability evaluation tool; pre-processing the first report by at least tokenizing the first report and generating a first vector for a first text portion of the first report; providing, to a machine learning model, the first vector as an input; classifying, by the machine learning model, the first vector based on a plurality of vulnerability vectors generated from a database of vulnerability policies required for an evaluation of the application; and outputting, by the machine learning model, a first indication of a first match between the first vector and a first vulnerability vector of the plurality of vulnerability vectors, the first indication representing a presence in the application of a first vulnerability mapped to the first vulnerability vector of the plurality of vulnerability vectors generated from the database of vulnerability policies.

16 Claims, 6 Drawing Sheets

(56) References Cited

OTHER PUBLICATIONS

Christiansen, S. et al., "Secure the software development lifecycle with machine learning," (available at https://www.microsoft.com/security/blog/2020/04/16/secure-software-development-lifecyclemachine-learning/).

Othmane, B. et al., "Time for Addressing Software Security Issues: Prediction Models and Impacting Factors," Data Sci. Eng. 2, 107-124 (2017).

* cited by examiner

| Application | Application Version | Category | Primary Location | Line Number | Full Filename | Criticality |
|---|---|---|---|---|---|---|
| AN-network | 1.0.0 | SQL Injection | 49taskmigration.sql | 19 | common/sql/48/mig/target/ga/49taskmigration.sql | Critical |
| AN-network | 1.0.0 | SQL Injection | 49CSVPaymentBatchTaskMigration.sql | 19 | common/sql/49/Hot_Fixes/49CSVPaymentBatchTaskMigration.sql | Critical |
| AN-network | 1.0.0 | SQL Injection | 49taskmigration.sql | 19 | common/sql/48/mig/target/ga/49taskmigration.sql | Critical |
| AN-network | 1.0.0 | SQL Injection | 49CSVPaymentBatchTaskMigration.sql | 19 | common/sql/49/Hot_Fixes/49CSVPaymentBatchTaskMigration.sql | Critical |
| AN-network | 1.0.0 | SQL Injection | 49taskmigration.sql | 19 | common/sql/48/mig/target/ga/49taskmigration.sql | Critical |
| AN-network | 1.0.0 | SQL Injection | 49CSVPaymentBatchTaskMigration.sql | 19 | common/sql/49/Hot_Fixes/49CSVPaymentBatchTaskMigration.sql | Critical |
| AN-network | 1.0.0 | SQL Injection | 49CSVPaymentBatchTaskMigration.sql | 19 | common/sql/49/Hot_Fixes/49CSVPaymentBatchTaskMigration.sql | Critical |
| AN-network | 1.0.0 | SQL Injection | 49taskmigration.sql | 19 | common/sql/48/mig/target/ga/49taskmigration.sql | Critical |
| AN-network | 1.0.0 | SQL Injection | 49CSVPaymentBatchTaskMigration.sql | 19 | common/sql/49/Hot_Fixes/49CSVPaymentBatchTaskMigration.sql | Critical |
| AN-network | 1.0.0 | SQL Injection | 49taskmigration.sql | 19 | common/sql/48/mig/target/ga/49taskmigration.sql | Critical |
| AN-network | 1.0.0 | SQL Injection | 49CSVPaymentBatchTaskMigration.sql | 19 | common/sql/49/Hot_Fixes/49CSVPaymentBatchTaskMigration.sql | Critical |

AUTOMATICALLY RATING THE PRODUCT'S SECURITY DURING SOFTWARE DEVELOPMENT

BACKGROUND

Software development is a complex process including a variety of tools to enable developers to develop, test, and fix code in an efficient manner to enable deployment of the code. The process includes tracking versions of the code, detecting errors, fixes, etc. To make matters more complex, the software development may include a myriad of constantly changing vulnerability requirements, including vulnerability requirements that can be specific to the developer or a given end user receiving the deployed code.

SUMMARY

Methods, systems, and articles of manufacture, including computer program products, are provided for evaluating applications.

According to an aspect, a system includes at least one data processor; and at least one memory storing instructions which, when executed by the at least one data processor, result in operations including: receiving a first report from at least a first vulnerability evaluation tool, the first report including text indicating at least one vulnerability of an application being evaluated; pre-processing the first report by at least tokenizing the first report and generating a first vector for a first text portion of the first report; providing, to a machine learning model, the first vector as an input; classifying, by the machine learning model, the first vector based on a plurality of vulnerability vectors generated from a database of vulnerability policies required for an evaluation of the application; and outputting, by the machine learning model, a first indication of a first match between the first vector and a first vulnerability vector of the plurality of vulnerability vectors, the first indication representing a presence in the application of a first vulnerability mapped to the first vulnerability vector of the plurality of vulnerability vectors generated from the database of vulnerability policies.

In some variations, one or more of the features disclosed herein including the following features can optionally be included in any feasible combination. A second report may be received from at least a second vulnerability evaluation tool, the second report including text indicating at least a second vulnerability of the application being evaluated. The second report may be pre-processed by at least tokenizing the second report and generating a second vector for a second text portion of the first report. The second vector may be provided to the machine learning model as the input, wherein the classifying, by the machine learning model, further comprises classifying the first vector and the second vector based on the plurality of vulnerability vectors generated from the database of vulnerability policies required for the evaluation of the application. The outputting may further include outputting a second indication, wherein the second indication of a second match between the second vector and a second vulnerability vector of the plurality of vulnerability vectors, the second indication representing a presence in the application of the second vulnerability mapped to the second vulnerability vector of the plurality of vulnerability vectors generated from the database of vulnerability policies. The first vulnerability evaluation tool may be a cloud-based service, and the second vulnerability evaluation tool may be on premise with the machine learning model. A vulnerability score may be generated for the application based on a quantity of indications classified by the machine learning model. The vulnerability score may be determined by reducing a pre-determined score by the quantity of the indications including the first indication and the second indication. A user interface including the vulnerability score may be generated to enable display. The first vulnerability includes an SQL injection vulnerability. The second vulnerability may include a no cross site scripting vulnerability or a no remote code injection vulnerability. The first report may include the text indicating the at least one vulnerability of the application being evaluated, a version of the application being evaluated, a location where a portion of code having the first vulnerability was detected in the application, and a criticality indication of the first vulnerability. The machine learning model may include a neural network. The classifying may include comparing the first vector to the plurality of vulnerability vectors, wherein the first vector matches the first vulnerability vector within a similarity threshold.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 depicts an example of a vulnerability report, in accordance with some example embodiments;

Like labels are used to refer to same or similar items in the drawings.

DETAILED DESCRIPTION

Software developers and security experts may collaborate to develop software that can be considered secure. To that end, code may be evaluated based on one or more vulnerability policies, such as standards and other types of requirements, during the lifecycle of the code. For example, the code of a software product may be evaluated during a security validation process that conducts a risk-based security assessment and validation of the software product. This evaluation may include an assignment of an indication of the vulnerability of the software product. This indication may take a variety of forms, such as a score, a rating, and the like. For example, a rating or score may be assigned on a pre-determined scale of 1 to 5, where 5 indicates a secure software product (e.g., with no or few vulnerabilities).

There may be dozens if not hundreds of vulnerability policies, such as standards, requirements, rules, and the like, that software should, or must, comply with to reduce risk. For example, a policy may identify the security vulnerability (e.g., conditions that cause the vulnerability in the code) and/or defensive measures to prevent the security vulnerably (e.g., suggested fixes or changes to avoid or reduce the vulnerability). And, these policies may be dynamic in the sense that the policies may change over time as new vulnerabilities to code or identified.

For example, a vulnerability policy may be no "remote code injection." The remote code injection vulnerability policy may identify a vulnerability in the code of the software product that allows an attacker to remotely inject code into the code and thus change the execution of the code including the software product. The remote code injection vulnerability may appear in cases where there is a dynamic runtime evaluation of code. Another example of a vulnerability policy is no "cross site scripting." In the case of cross site scripting, the vulnerability allows an attacker to compromise the user interactions with the software product, such as an application. The complexity of these policies, the dynamic nature of the policies, and the quantity of these policies make evaluating the development of a software product a burdensome and seemingly intractable task.

In some embodiments, there is provided a machine-learning (ML) based approach to performing vulnerability assessments of the code of a software product or application.

Figure 1:
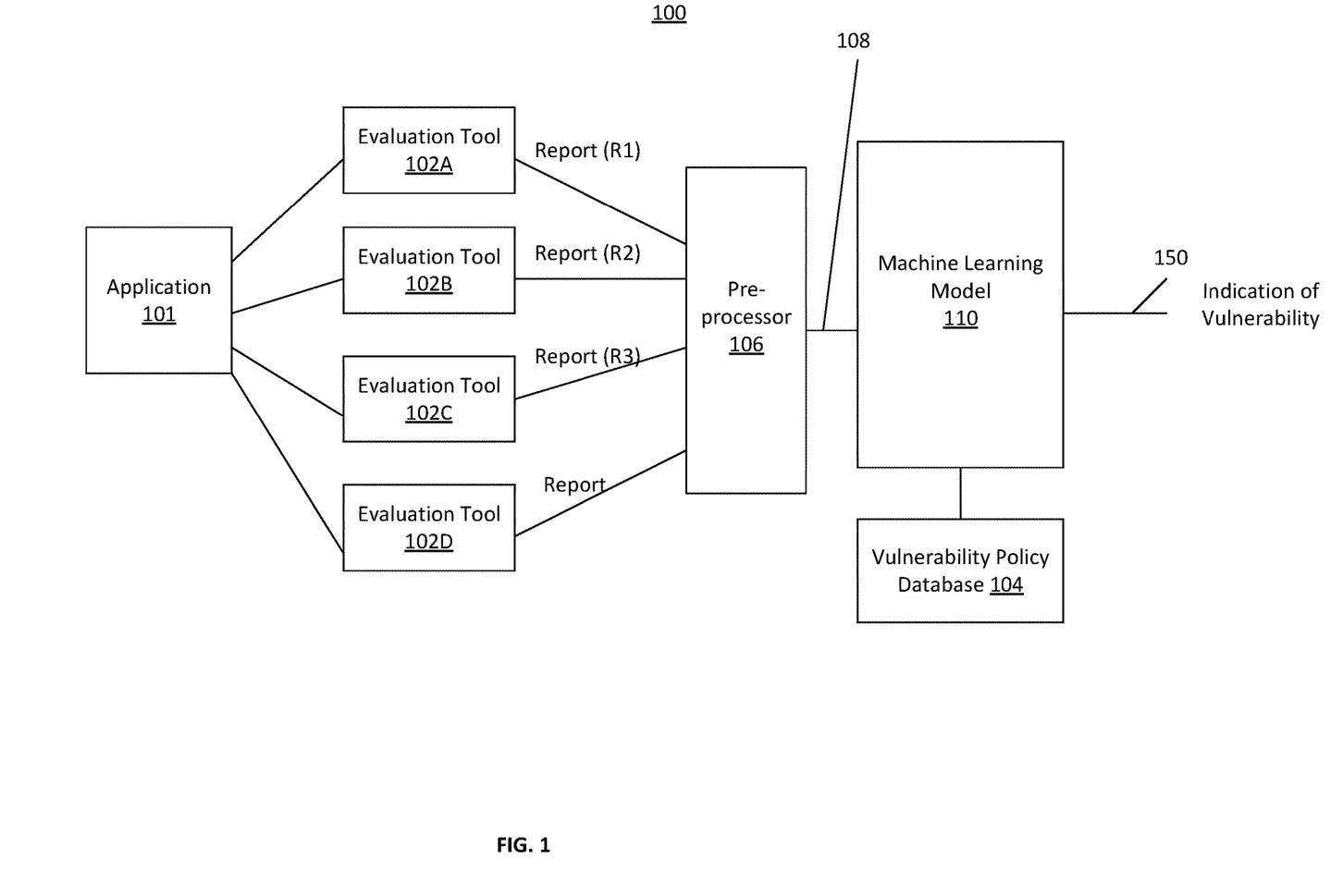
FIG. 1 depicts an example of a system for performing vulnerability assessments of code for a software product or application, in accordance with some example embodiments.

FIG. 1 depicts an example of a system 100 for performing vulnerability assessments of the code of a software product or application, in accordance with some example embodiments.

The system 100 may include an application 101 being evaluated by one or more evaluation tools 102A-D, a pre-processor 106, a machine learning (ML) model 110 (which outputs an indication of the vulnerability of the application 101), and a vulnerability policy database 104.

The application 101 is the application being evaluated for vulnerabilities. The application 101 may be evaluated by one or more evaluation tools, such as evaluation tools 102A-D. These evaluation tools may access or receive at least a portion of the code of the application 101. The evaluation tool may then scan the code of the application 101 for one or more of the following vulnerabilities: viruses, security vulnerability, malware, open source licenses, personal or private information leakage, buffer overflow, command injection, denial of service, format string, integer overflow, log forging, privacy violation, race conditions, session fixation, SQL injection, system information leak, and/or the like. For example, the first evaluation tool 102A may perform static analysis on the lines of code of application 101, while the second evaluation tool 102B may perform a more dynamic evaluation of the application, such as a runtime evaluation of the application including its code. The third evaluation tool 102C may perform both static and dynamic security scans of the code for application 101. Moreover, the fourth evaluation tool may perform an open source license audit for the code of application 101. In some implementations, the evaluation tools are different types of tools. Alternatively, or additionally, an evaluation tool may be a web service that access the code of application 101 via the Internet and responds with a corresponding report of any identified vulnerabilities. Alternatively, or additionally, an evaluation tool may be on-premise with the code of the application 101, pre-processor 106, ML model 110, and the like.

The evaluation tools 102A-D may each generate an output, such as a report listing in text (e.g., words, numbers, etc.) any identified vulnerabilities in the application 101. FIG. 2 depicts an example of a report 210 generated by the evaluation tool 102A. In the example of FIG. 2, the first evaluation tool 102A evaluates the application 101 and generates report 210 including the results of the scan of the application. In the example report 210, the first evaluation tool identifies a vulnerability, which in this example is an SQL injection vulnerability 212. The SQL injection vulnerability is a vulnerability that allows an attacker to interfere with queries made by the application 101 to a database, such that the attacker can view data that the attacker is not allowed to retrieve and/or that belongs to other users. In the example of FIG. 2, the report also shows the identity 214 of the application under evaluation (which in this example is application 101), the version 216 of the application 101, the primary location 218 where the vulnerable code was detected in the application, the vulnerable line of code number 220, the full file name where the vulnerable code can be found in the application server directory 222, and the criticality 224 of the identified vulnerability.

Referring again to FIG. 1, the ML model 110 receives one or more reports from one or more of the evaluation tools 102A-D. The ML model may then use machine learning (e.g., natural language processing, such as a neural network trained with text (e.g., with labels) including reports to parse and classify the text) to parse text from the reports and classify (or categorize) the parsed text into corresponding vulnerability categories. In other words, the ML model may evaluate one or more words from the report and determine a corresponding vulnerability. Moreover, the evaluation tools may be different and thus provide different types of reports, so the ML model is able to receive reports from different types of evaluation tools and generate an output regarding whether the reports identify a violation a vulnerability policy, which may be stored in the database 106.

In some embodiments, the reports provided by the evaluation tools may processed by a pre-processor 106 before being provided to the ML model 110. The pre-processing may include one or more of the following: stemming, tokenization, removal of stop words, word embedding, and/or other forms of pre-processing and clean up. For example, stemming may reduce one or more words in a report to corresponding root words. The pre-processing may also tokenize, which refers to splitting paragraphs into sentences and sentences into individual words. Stop words (e.g., connecting parts of a sentence like "the" and "and") may be removed. And, word embedding may be used to represent a given word as a vector such that related words are placed closer together in a two-dimensional or x-y space. Alternatively, or additionally, sentence embedding (e.g., a group of words, such as a phrase or sentence) may be used to represent the sentence as a vector such that related sentences are placed closer together in a two-dimensional or x-y space.

The ML model 110 may receive a first report, such as report R1 from evaluation tool 102A (or pre-processed report if pre-processor 106 is implemented) and categorize the content of the report into one or more vulnerability categories obtained from the vulnerability policy database 104. Likewise, the ML model 110 may receive a second report, report R2 from evaluation tool 102B (or pre-processed report if pre-processor 106 is implemented) and categorize the content of the second report into one or more vulnerability categories obtained from the vulnerability policy database 104; and so forth for each report R3, R4, etc. to categorize the contents of each report into one or more vulnerability categories obtained from the vulnerability policy database 104.

Table 1 below illustrates an example for illustration that includes three vulnerability policies (which are obtained from the vulnerability policy database 104). The three categories of vulnerability policies in this example are no cross site scripting policy, no remote code injection, and no database query injection (also referred to in some reports as SQL injection), although other types and quantities of vulnerability categories may be used as well. Indeed, as noted above, there may be dozens if not hundreds of policies used to evaluate the application 101. Table 1 shows that the first report (R1) from the first evaluation tool 102A includes two vulnerabilities, no cross site scripting policy and no remote code injection; the second report (R2) from the second evaluation tool 102B includes two vulnerabilities, no cross site scripting policy and no database query injection policy; the third report (R3) from the third evaluation tool 102C includes one vulnerability, no database query injection policy; and the fourth report (R4) from the fourth evaluation tool 102D includes one vulnerability, no remote code injection.

For a given report from for example the first evaluation tool 102A, the report may be pre-processed at 106 and one or more vectors generated from the report may be classified by the ML model 110 to determine whether any of the one or more vectors from the report map to any of the vulnerabilities categories. For example, the ML model may classify whether a word vector for one or more words of a report are the same or similar to one or more words used to describe a vulnerability identified in the vulnerability policies or categories defined at database 104. To illustrate further, a first report, R1, may include a phrase "no cross site" which is converted to a vector (e.g., converted by the pre-processor 106 into a word vector such as an embedded word vector generated by word2vec or other technology) and classified by the ML model 110 into one of the vulnerability categories. In this example, the ML model classifies the vector for the first report, R1 (e.g., a vector representing "no cross site") to a vulnerability vector (which corresponds to the vulnerability policy from database 104) for "no cross site scripting." In some embodiments, each policy in the vulnerability policy database is converted into a vector to enable comparison with input vectors applied at 108.

In the example of Table 1, a first vector generated from a portion of the first report R1 (e.g., a portion of the report indicating "cross site") may be categorized (e.g., mapped, classified, etc.) to the vulnerability category "no cross site scripting policy category" (or the corresponding vector for "no cross site scripting policy category"). In other words, in the vector domain, the ML model 110 considers the first vector (which corresponds to the portion of the first report R1) to be the same or similar to the corresponding vulnerability vector (which represents vulnerability category or policy for "no cross site scripting policy category"). The reports are thus processed and categorized by the ML model to automatically determine the categories of vulnerabilities in the reports provided by the evaluation tools 102A-D. Moreover, the ML model is trained so that it can generalize and categorize across different types of reports generated by different types of evaluation tools.

TABLE 1

| No cross site scripting policy category | No Remote code injection category | No database query injection policy category |
| --- | --- | --- |
| R1 | R1 | R2 |
| R2 | R4 | R3 |

Although the previous examples describe the instances where the text in the report (or the word vector) is the same as the vulnerability category, there may be instances where the text in the report (or the word vector) is not an exact match to the vulnerability category (or its word vector). When this is the case, the similarity between the word vector for the text of the report and the vulnerability vector for the vulnerability categories may be determined. For example, if the similarity is within a similarity threshold (e.g., a threshold distance in two-dimensional space) the machine learning model may categorize the text of the report into the vulnerability category. Moreover, the ML model 110 may take into account the context of the text in relation to other text in a report. For example, the term "cross" on its own may not be determinative of the presence of a "cross site scripting" policy violation, so the ML model may take into account the context by evaluating one or more terms before and/or after the term "cross" to determine whether the "cross cite scripting" policy violation is present.

The ML model 110 may be trained using supervised or unsupervised learning techniques. In the case of supervised ML, a reference set of reports are annotated with labels indicating how the ML model should classify portions of the reports. The reference set is then input into the ML model until the ML, model converges and learns how to classify the reference set correctly. After training, the ML model may then be ready for operations and be provided with non-reference data, such as new data to classify from the evaluation tools. The ML model may take the form of a neural network, Bayesian network, support vector machine, maximum entropy machine, and/or the like. In the case of unsupervised learning, the ML model is trained without using an annotated reference set of data. For example, clustering may be used to group similar groups of words from the reports and the policy database. Likewise, Latent Semantic Indexing may be used in an unsupervised training regime by identifying words and phrases that frequently occur with each other in order to classify whether a report indicates a policy violation.

The ML model 110 may also provide at 150 an indication of the vulnerability of the application 101 under evaluation based on the classification of the reports. This indication may be in the form of a simple indication, such as a "true" a vulnerability is present, or may be in the form of a score, such as a rating. Table 2 depicts an example of an indication, which in this example is a "−1" to indicate that the report identifies a vulnerability in the application 101. In some embodiments, the indications obtained from a plurality of reports may be aggregated (e.g., combined) to determine an aggregate (or summary) indication of the vulnerability of the application 101.

TABLE 2

| No cross site scripting policy category | No database query injection policy category |
| --- | --- |
| R1 ("XSS", "Cross-Site Scripting" "Java Script") | R1 ("database" "query" injection" SQL") |
| −1 | −1 |

In some embodiments, the text in a report may be weighted, such that certain key words have a greater weight in determining a given vulnerability. Table 3 below depicts the words obtained from the first report from evaluation tool 102A. In the example of Table 3, the key word "injection" is weighted more heavily in determining whether a database query injection vulnerability is present in the report. Likewise, the keyword "XSS" is weighted more heavily in determining whether a cross citing vulnerability is present. In both cases, the indication of the vulnerability is provided as a "−1." In some embodiments, the ML model 110 automatically identifies the key words that are weighted more heavily in determining whether vulnerability is present in the report.

TABLE 3

| Report | Words | Vulnerability Policy | Key Words | Score |
|---|---|---|---|---|
| R1 | "database", "query", "injection", "SQL", | No database query injection policy category | "injection" | −1 |
| R1 | "XSS", "Cross-Site Scripting", "Javascript" | No cross site scripting policy category | "XSS" | −1 |

Figure 3:
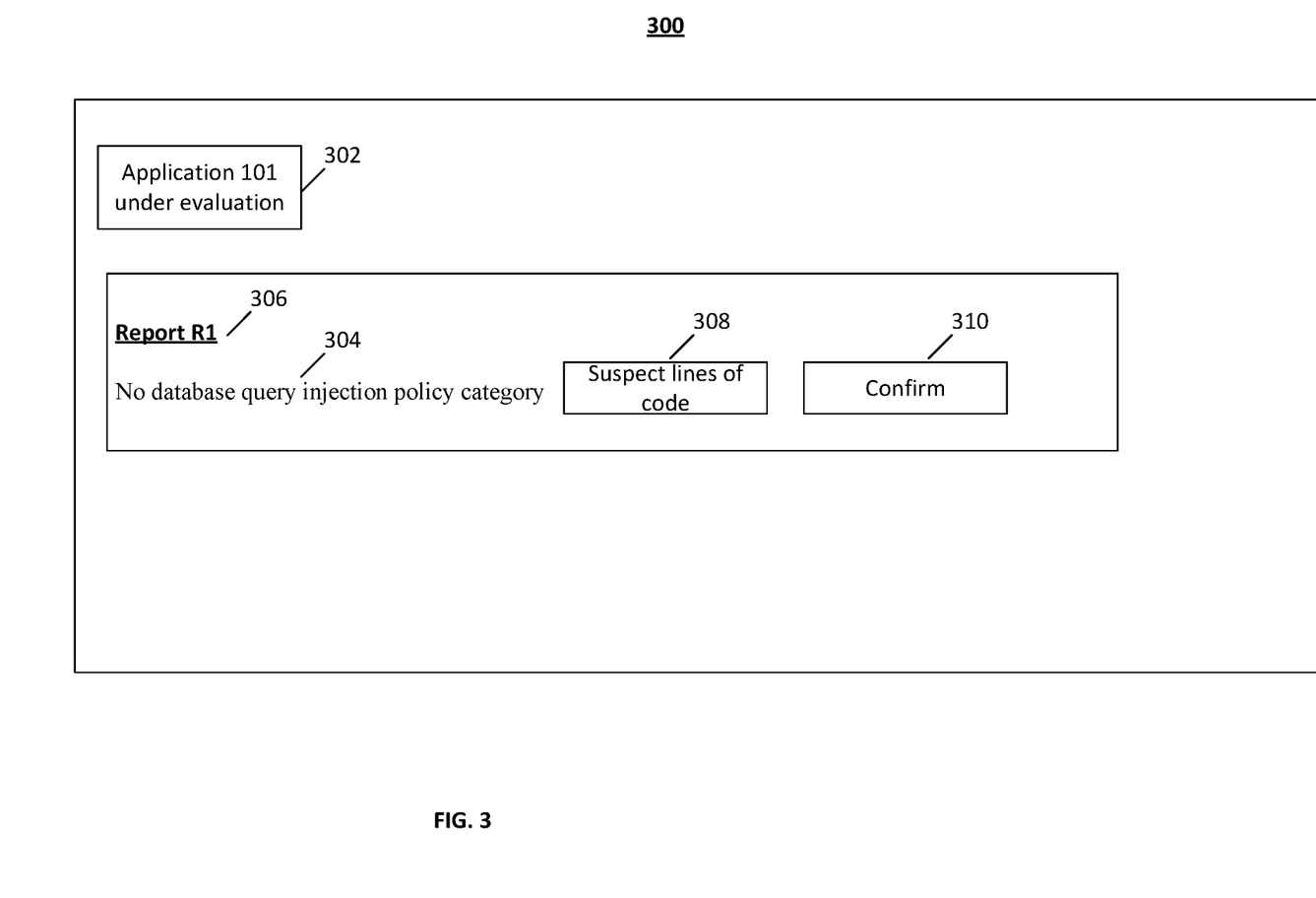
FIG. 3 depicts an example of a user interface view, in accordance with some example embodiments.

FIG. 3 depicts an example of a user interface view 300 presented via a display to a user. The user interface view includes an indication 302 of the application under evaluation (which is application 101 in this example), an identity 306 of the report (and/or evaluation tool) which in this example is report R1 generated by evaluation tool 102A, an indication 304 of the type of vulnerability detected by the ML model (which in this example is no database query injection policy), the corresponding code 308 suspected of causing the vulnerability, and a user interface element 310 which when selected, via the user interface view 300, provides feedback confirming the accuracy of the detected vulnerability and the suspect code 308. This feedback may serve as annotated data (which may be used for training of the ML model) and/or for measuring the accuracy of the ML model's classification of the vulnerabilities.

Figure 4:
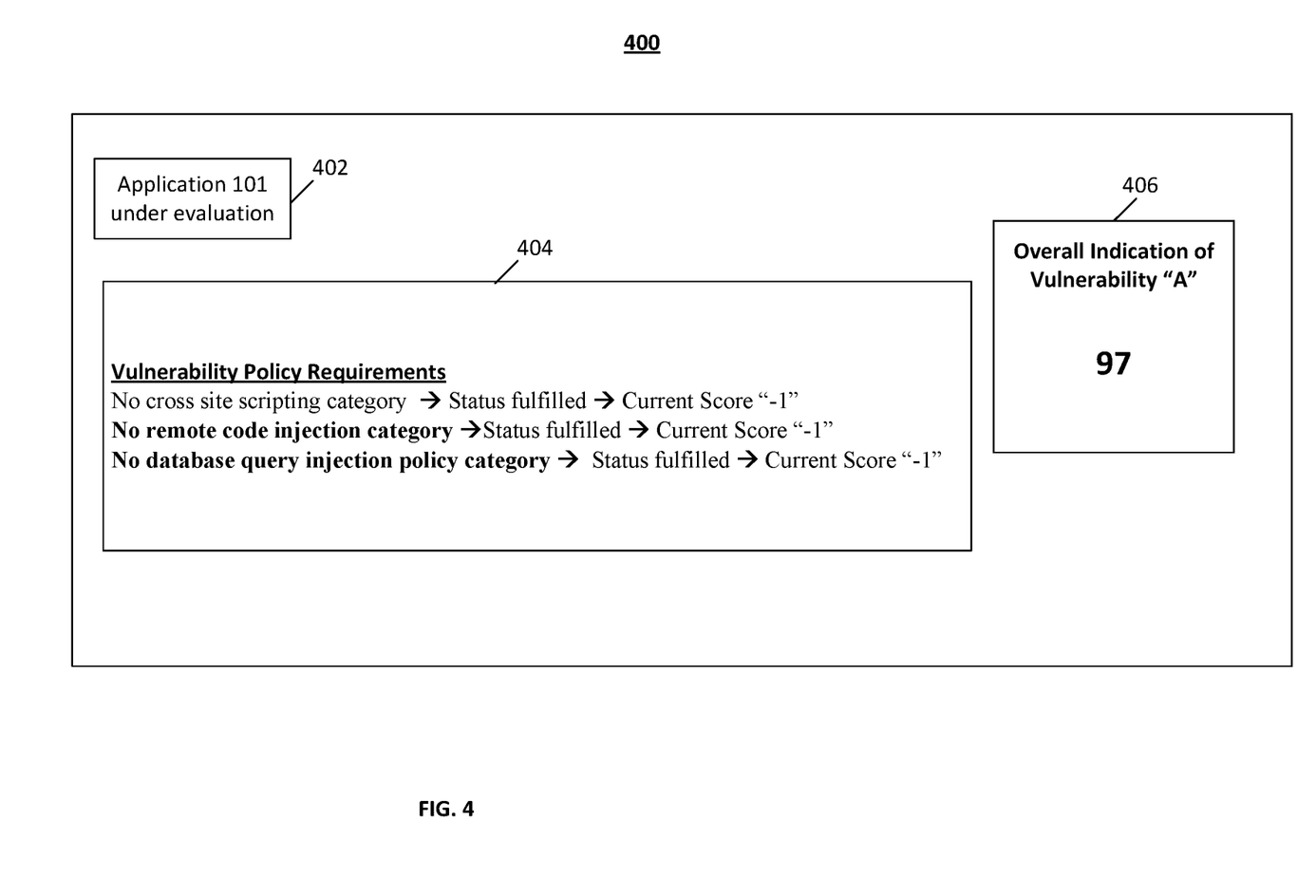
FIG. 4 depicts another example of a user interface view, in accordance with some example embodiments.

FIG. 4 depicts an example of a user interface view 400 presented via a display to a user. In some embodiments, a user interface view 400 may be presented via a display to a user. The user interface view includes an indication 402 of the application under evaluation (which is application 101 in this example) and a listing 404 of the vulnerabilities detected or classified by the ML model 110. In this example, the ML model classified from reports R1-R4 the presence of three vulnerabilities, such as no cross site scripting, no remote code injection, and no database query injection as shown at 404 along with the scores "−1." To illustrate further, a given application 101 may initially have a baseline score (e.g., of 100) before any testing begins. In this example, whenever a vulnerability is detected, the vulnerability reduces the baseline score by a predetermined value (e.g., −1). Returning to the example of FIG. 4, the overall aggregate score at 406 is 97, which represents the baseline score reduced by the three noted vulnerabilities. As noted, this aggregate vulnerability may correspond to an overall assessment of application 101 that takes in account the vulnerabilities identified by the ML model. Although the previous aggregate scoring scheme is based on a baseline score (representing the highest score with no detected vulnerabilities) reduced by the quantity of detected vulnerabilities, other scoring schemes may be used as well. Alternatively, or additionally, the indication at 406 may be a pass-fail type indication, where fail indicate the vulnerabilities are such that the application under evaluation needs further development and re-work by its developers before operation use or the quantity of vulnerabilities exceed a threshold quantity. For example, if the application 101 fails or the aggregate score at 406 is below a threshold, the application is considered to have failed one or more mandatory software security policies so re-work and further development is required before operational use or release of application 101.

Figure 5:
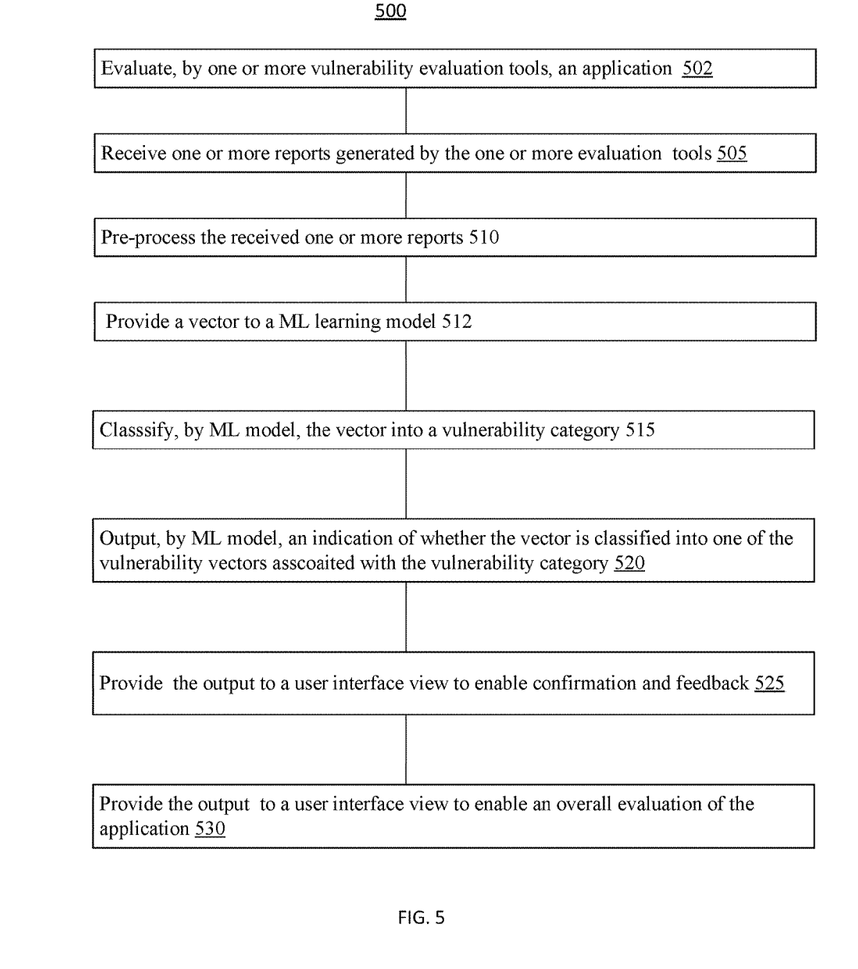
FIG. 5 depicts an example of a process for machine learning vulnerability assessment of code, in accordance with some example embodiments.

FIG. 5 depicts an example of a process 500 for ML-based learning vulnerability assessments of code, in accordance with some embodiments.

At 502, the application may be evaluated by one or more evaluation tools. For example, an evaluation tool, such as evaluation tool 102A may access the application 101 (and/or it corresponding code) and scan the code for vulnerabilities and generate a report. The scan may be a so-called static scan of the application (or its lines of code) and/or a dynamic scan during runtime of the application. Moreover, the evaluation tools may each be scanning for different types of vulnerabilities in the application 101. For example, a first evaluation tool may scan for security vulnerabilities, malware, etc., while the second evaluation tool open may scan for open source licenses, personal or private information leakage, and/or the like. An evaluation tool may be a web or cloud service performing the evaluation (e.g., via the Internet) of application 101 or may be on-premise with the ML model 110.

At 505, one or more evaluation tools may generate and provide one or more reports, which are received at a pre-processor 106. For example, an evaluation tool may generate a report in the form of text, such as words, an example of which is depicted at FIG. 2. The report may in in a variety of formats, such as JSON, comma separated values, and the like.

At 510, the received reports may be pre-processed at pre-processor 106. For example, the pre-processor 106 may process report R1 for example by stemming the report (e.g., reducing citing to cite). The pre-processor 106 may process report R1 by also tokenizing the report (e.g., splitting paragraphs into sentences and sentences into individual words). The pro-processor 106 may also remove stop words. And the pro-processor may generate one or more vectors for a given report. For example, the vector may correspond to a portion of the report, such as one or more words, a phrase, or a sentence. As noted, the vector may be generated as a word embedding (e.g., using a tool such as word2vec and the like).

At 512, the pre-processor 106 provides a vector to the ML model 110. For example, the pre-processor may generate at least one vector for at least one word found in a portion of a report, such as report R1. And, this at least one vector may be provided as an input at 108 to the ML model.

At 515, the ML model 110 classifies the received vector into a vulnerability category. For example, the vector (which is received at 108) is compared to a plurality of vulnerability vectors for the different vulnerability categories obtained from the vulnerability policy database 104. If the received vector and a vulnerability vector are the same or similar (e.g., within a threshold distance in the vector domain), the ML model classifies (e.g., maps) the received vector as the vulnerability corresponding to the vulnerability vector.

At 520, the ML model provides an output 150 to indicate whether the received vector is classified into one of the vulnerability vectors. As noted, the ML model's output 150 may be a binary indication, such as a "true" or "−1" that a vulnerability is present, or may be in the form of a score, such as a rating.

At 525, the output 150 is provided to a user interface view to enable confirmation and feedback. For example, the output 150 may be provided to the user interface view 300 for presentation at 304 of FIG. 3. In some embodiments, user interface view enables a user to confirm at 310 whether the output is accurate. If so, the confirmation (e.g., the output for the suspect lines of code 308) is annotated and used to train the ML model. Alternatively, or additionally, the output's confirmation to assess the accuracy of the ML model's classification of the vulnerabilities. For example, if the accuracy falls below a threshold, this may indicate that the ML model needs to be re-trained.

At 530, the output is provided to a user interface view to enable an overall evaluation of the application. For example, the output 150 may be provided to the user interface view 400 of FIG. 3. To illustrate further, the output may be use to indicate at the listing 404 whether the application includes a vulnerability and may be used to update the overall vulnerability at 406.

Figure 6:
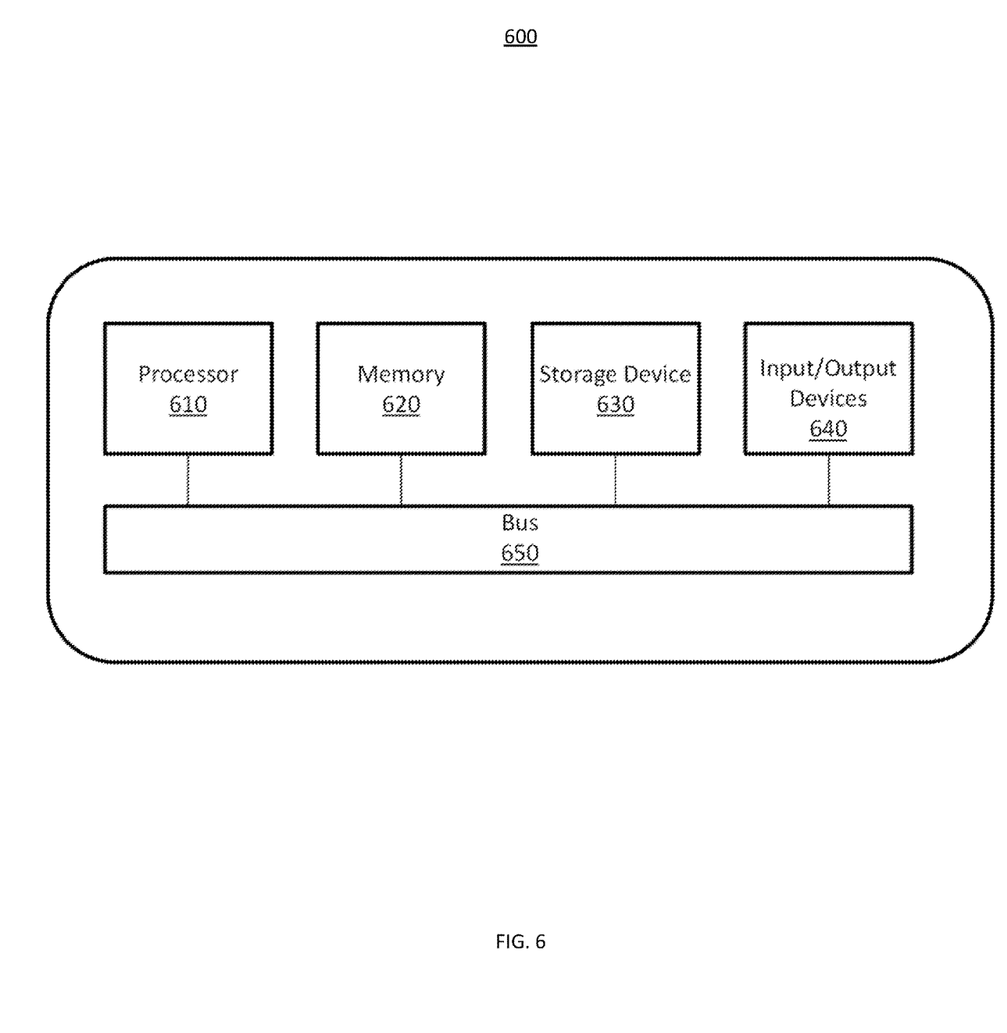
FIG. 6 depicts a block diagram illustrating a computing system consistent with implementations of the current subject matter.

FIG. 6 depicts a block diagram illustrating a computing system 600 consistent with implementations of the current subject matter. For example, the system 600 can be used to implement system 100 or one or more of the components depicted at FIG. 1.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the trusted server, client devices (parties), and/or the like. In some implementations of the current subject matter, the processor 610 can be a single-threaded processor. Alternately, the processor 610 can be a multi-threaded processor. The process may be a multi-core processor have a plurality or processors or a single core processor. The processor 610 is capable of processing instructions stored in the memory 620 and/or on the storage device 630 to display graphical information for a user interface provided via the input/output device 640. The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces. According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some implementations of the current subject matter, the computing system 600 can be used to execute various interactive computer software applications that can be used for organization, analysis and/or storage of data in various (e.g., tabular) format (e.g., Microsoft Excel®, and/or any other type of software). Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system comprising: at least one data processor; and at least one memory storing instructions which, when executed by the at least one data processor, result in operations comprising: receiving a first report from at least a first vulnerability evaluation tool, the first report including text indicating at least one vulnerability of an application being evaluated; pre-processing the first report by at least tokenizing the first report and generating a first vector for a first text portion of the first report; providing, to a machine learning model, the first vector as an input; classifying, by the machine learning model, the first vector based on a plurality of vulnerability vectors generated from a database of vulnerability policies required for an evaluation of the application; and outputting, by the machine learning model, a first indication of a first match between the first vector and a first vulnerability vector of the plurality of vulnerability vectors, the first indication representing a presence in the application of a first vulnerability mapped to the first vulnerability vector of the plurality of vulnerability vectors generated from the database of vulnerability policies.

Example 2. The system of Example 1 further comprising: receiving a second report from at least a second vulnerability evaluation tool, the second report including text indicating at least a second vulnerability of the application being evaluated; pre-processing the second report by at least tokenizing the second report and generating a second vector for a second text portion of the first report; providing, to the machine learning model, the second vector as the input, wherein the classifying, by the machine learning model, further comprises classifying the first vector and the second vector based on the plurality of vulnerability vectors generated from the database of vulnerability policies required for the evaluation of the application, and wherein the outputting, by the machine learning model, further comprises outputting a second indication, wherein the second indication of a second match between the second vector and a second vulnerability vector of the plurality of vulnerability vectors, the second indication representing a presence in the application of the second vulnerability mapped to the second vulnerability vector of the plurality of vulnerability vectors generated from the database of vulnerability policies.

Example 3. The system of Example 1 or 2, wherein the first vulnerability evaluation tool is a cloud-based service, and the second vulnerability evaluation tool is on premise with the machine learning model.

Example 4. The system of Example 1-3 further comprising: generating, for the application, a vulnerability score based on a quantity of indications classified by the machine learning model.

Example 5. The system of Example 1-4, wherein the vulnerability score is determined by reducing a pre-determined score by the quantity of the indications including the first indication and the second indication.

Example 6. The system of Examples 1-5 further comprising: generating a user interface including the vulnerability score to enable display.

Example 7. The system of Examples 1-6, wherein the first vulnerability comprises an SQL injection vulnerability.

Example 8. The system of Examples 1-7, wherein the second vulnerability comprises a no cross site scripting vulnerability or a no remote code injection vulnerability Example 9. The system of Examples 1-8, wherein the first report includes the text indicating the at least one vulnerability of the application being evaluated, a version of the application being evaluated, a location where a portion of code having the first vulnerability was detected in the application, and a criticality indication of the first vulnerability.

Example 10. The system of Examples 1-9, wherein the machine learning model comprises a neural network.

Example 11. The system of Examples 1-10, wherein the classifying includes comparing the first vector to the plurality of vulnerability vectors, wherein the first vector matches the first vulnerability vector within a similarity threshold.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
      receiving a first report from at least a first vulnerability evaluation tool, the first report including text indicating at least one vulnerability of an application being evaluated;
      pre-processing the first report by at least tokenizing the first report and generating a first vector for a first text portion of the first report;
      providing, to a machine learning model, the first vector as an input;
      classifying, by the machine learning model, the first vector based on a plurality of vulnerability vectors generated from a database of vulnerability policies required for an evaluation of the application;
      outputting, by the machine learning model, a first indication of a first match between the first vector and a first vulnerability vector of the plurality of vulnerability vectors, the first indication representing a presence in the application of a first vulnerability mapped to the first vulnerability vector of the plurality of vulnerability vectors generated from the database of vulnerability policies; and
      generating, for the application, a vulnerability score based on a quantity of indications classified by the machine learning model, wherein the vulnerability score is determined by reducing a pre-determined score by the quantity of the indications including the first indication and one or more other indications.

2. The system of claim 1 further comprising:
   receiving a second report from at least a second vulnerability evaluation tool, the second report including text indicating at least a second vulnerability of the application being evaluated;
   pre-processing the second report by at least tokenizing the second report and generating a second vector for a second text portion of the second report;
   providing, to the machine learning model, the second vector as the input,
   wherein the classifying, by the machine learning model, further comprises classifying the first vector and the second vector based on the plurality of vulnerability vectors generated from the database of vulnerability policies required for the evaluation of the application, and
   wherein the outputting, by the machine learning model, further comprises outputting a second indication of a second match between the second vector and a second vulnerability vector of the plurality of vulnerability vectors, the second indication representing a presence in the application of the second vulnerability mapped to the second vulnerability vector of the plurality of vulnerability vectors generated from the database of vulnerability policies.

3. The system of claim 2, wherein the first vulnerability evaluation tool is a cloud-based service, and the second vulnerability evaluation tool is on premise with the machine learning model.

4. The system of claim 1 further comprising:
   generating a user interface including the vulnerability score to enable display.

5. The system of claim 1, wherein the first vulnerability comprises an SQL injection vulnerability.

6. The system of claim 2, wherein the second vulnerability comprises a no cross site scripting vulnerability or a no remote code injection vulnerability.

7. The system of claim 1, wherein the first report includes the text indicating the at least one vulnerability of the application being evaluated, a version of the application being evaluated, a location where a portion of code having the first vulnerability was detected in the application, and a criticality indication of the first vulnerability.

8. The system of claim 1, wherein the machine learning model comprises a neural network.

9. The system of claim 1, wherein the classifying includes comparing the first vector to the plurality of vulnerability vectors, wherein the first vector matches the first vulnerability vector within a similarity threshold.

10. A method, comprising:
    receiving a first report from at least a first vulnerability evaluation tool, the first report including text indicating at least one vulnerability of an application being evaluated;
    pre-processing the first report by at least tokenizing the first report and generating a first vector for a first text portion of the first report;
    providing, to a machine learning model, the first vector as an input;
    classifying, by the machine learning model, the first vector based on a plurality of vulnerability vectors generated from a database of vulnerability policies required for an evaluation of the application;
    outputting, by the machine learning model, a first indication of a first match between the first vector and a first vulnerability vector of the plurality of vulnerability vectors, the first indication representing a presence in the application of a first vulnerability mapped to the first vulnerability vector of the plurality of vulnerability vectors generated from the database of vulnerability policies;
    generating, for the application, a vulnerability score based on a quantity of indications classified by the machine learning model, wherein the vulnerability score is determined by reducing a pre-determined score by the quantity of the indications including the first indication and one or more other indications.

11. The method of claim 10 further comprising:
    receiving a second report from at least a second vulnerability evaluation tool, the second report including text indicating at least a second vulnerability of the application being evaluated;
    pre-processing the second report by at least tokenizing the second report and generating a second vector for a second text portion of the second report;
    providing, to the machine learning model, the second vector as the input,
    wherein the classifying, by the machine learning model, further comprises classifying the first vector and the second vector based on the plurality of vulnerability vectors generated from the database of vulnerability policies required for the evaluation of the application, and wherein the outputting, by the machine learning model, further comprises outputting a second indication of a second match between the second vector and a second vulnerability vector of the plurality of vulnerability vectors, the second indication representing a presence in the application of the second vulnerability mapped to the second vulnerability vector of the plurality of vulnerability vectors generated from the database of vulnerability policies.

12. The method of claim 11, wherein the first vulnerability evaluation tool is a cloud-based service, and the second vulnerability evaluation tool is on premise with the machine learning model.

13. The method of claim 10 further comprising:
generating a user interface including the vulnerability score to enable display.

14. The method of claim 11, wherein the first vulnerability comprises an SQL injection vulnerability, and wherein the second vulnerability comprises a no cross site scripting vulnerability or a no remote code injection vulnerability.

15. The method of claim 10, wherein the first report includes the text indicating the at least one vulnerability of the application being evaluated, a version of the application being evaluated, a location where a portion of code having the first vulnerability was detected in the application, and a criticality indication of the first vulnerability.

16. A non-transitory computer readable storage medium including instructions which, when executed by at least one data processor, result in operations comprising:
receiving a first report from at least a first vulnerability evaluation tool, the first report including text indicating at least one vulnerability of an application being evaluated;
pre-processing the first report by at least tokenizing the first report and generating a first vector for a first text portion of the first report;
providing, to a machine learning model, the first vector as an input;
classifying, by the machine learning model, the first vector based on a plurality of vulnerability vectors generated from a database of vulnerability policies required for an evaluation of the application;
outputting, by the machine learning model, a first indication of a first match between the first vector and a first vulnerability vector of the plurality of vulnerability vectors, the first indication representing a presence in the application of a first vulnerability mapped to the first vulnerability vector of the plurality of vulnerability vectors generated from the database of vulnerability policies; and
generating, for the application, a vulnerability score based on a quantity of indications classified by the machine learning model, wherein the vulnerability score is determined by reducing a pre-determined score by the quantity of the indications including the first indication and one or more other indications.

* * * * *